United States Patent [19]

Bernard et al.

[11] Patent Number: 4,561,974
[45] Date of Patent: Dec. 31, 1985

[54] APPARATUS FOR THE ANAEROBIC FILTRATION OF WASTE WATER

[75] Inventors: Jacques Bernard, Saint German en Laye; Jean-Marie Rovel, Rueil Malmaison; Roger Nicol, Issy Les Moulineaux; Claude Prevot, Ville d'Avray, all of France

[73] Assignee: Degremont, Hatus de Seine, France

[21] Appl. No.: 576,408

[22] Filed: Feb. 2, 1984

[30] Foreign Application Priority Data

Feb. 3, 1983 [FR] France ................ 83 01680

[51] Int. Cl.⁴ .......................... C02F 3/28; C12M 1/18
[52] U.S. Cl. .................................. 210/151; 210/617; 210/218; 261/DIG. 72; 48/111; 435/300; 435/801
[58] Field of Search ............... 210/150, 151, 290, 617, 210/618, 603, 218; 261/DIG. 72; 48/197 A, 111; 435/801, 300, 167

[56] References Cited

U.S. PATENT DOCUMENTS

| | | | |
|---|---|---|---|
| 3,329,271 | 7/1967 | Ward et al. ........................ | 210/150 |
| 3,402,103 | 9/1968 | Amberg et al. ..................... | 210/150 |
| 3,589,518 | 6/1971 | Brebion et al. ..................... | 210/150 |
| 3,956,128 | 5/1976 | Turner ................................ | 210/150 |
| 4,002,705 | 1/1977 | McKeown ................. | 261/DIG. 72 |
| 4,336,135 | 6/1982 | Price ................................... | 210/151 |

OTHER PUBLICATIONS

Water Research, vol. 11, No. 3, 1977, pp. 295-304, Pergamon Press, G. B., E. S. K. Chian et al.: "Treatment of High Strength Acidic Wastewater with a Completely Mixed Anaerobic Filter" p. 296, Materials and Methods.

Primary Examiner—Benoît Castel
Attorney, Agent, or Firm—Wenderoth, Lind & Ponack

[57] ABSTRACT

An apparatus for the anaerobic filtration of waste water includes a filter of filling material through which the waste water to be treated is passed from the bottom to the top. The filter includes upper and lower superposed layers of filling material separated by an intermediate layer of material. The lower layer is in the form of an ordered arrangement of the material thereof. The upper and intermediate layers each include a loosely packed arrangement of the material thereof.

10 Claims, 2 Drawing Figures

APPARATUS FOR THE ANAEROBIC FILTRATION OF WASTE WATER

BACKGROUND OF THE INVENTION

The present invention relates to an apparatus for the anaerobic filtration of waste water with the simultaneous production of biogas, and specifically to the type of such apparatus provided with a filling material which is infiltrated from the bottom to the top by the water to be treated.

More particularly, a submerged filter embodying the principles of the invention can be used for the treatment of industrial waste water with heavy carbonaceous polution such as waste water from agro-alimentary industries, fermentation industries, synthetic chemical industries, paper pulp industries, etc., permitting the production of considerable amounts of biogas, i.e. from 0.4 to 0.6 $m^3$ per kg of eliminated Chemical Oxygen Demand (COD).

Various devices of this general type are well known in the art and include anaerobic filters containing a filling material made of plastic and through which passes from bottom to top the waste water to be treated. Such filters generally can be classified into two groups.

In one known group, a filter contains a filling material such as loosely packed plastic rings. This loose packing permits rapid colonization of the waste material by the anaerobic microorganisms and a considerable accumulation of biomass, and thus is an effective treatment. However, with this type of filter there is the considerable danger that the filter will become clogged, thereby causing the material to become compacted. Moreover, the specific surface, i.e. the surface area per ring volume, often is inadequate, particularly if the filter is in the form of plastic rings with a large diameter, thus causing the material to become compacted.

A filter of the other prior art group includes an ordered filling material, for example tubes or corrugated plates of plastic material, such as known by the various trade names "Cloisonyle", "Plasdek", etc. This arrangement substantially eliminates the danger of clogging, but has other drawbacks, namely the colonization of the material by the micro-organisms is very slow, and there is the danger that the fixed culture will become disengaged upon the occurrence of sudden changes in operating conditions, i.e. pressure and velocity of flow.

SUMMARY OF THE INVENTION

With the above discussion in mind, it is the object of the present invention to provide an apparatus for the anaerobic filtration of waste water, of the general type described above, but having an improved filter, whereby it is possible to overcome the above and other prior art disadvantages while still preserving the advantages of filters of this general type.

This object is achieved in accordance with the present invention by the provision of an apparatus for the anaerobic filtration of waste water and of the type including a filter of filling material through which the waste water to be treated is passed from bottom to top, during which biogas is produced, with means for collecting the biogas above the filter, the filter comprising upper and lower superposed layers of filling material separated by an intermediate layer of material. The lower layer comprises an ordered arrangement of the material thereof. The upper and intermediate layers each comprise a loosely packed arrangement of the material thereof.

According to the present invention, the filling material of the lower layer comprises a plurality of vertically extending and parallelly arranged tubes, or alternatively a plurality of vertically extending and parallelly arranged corrugated plates. The tubes or plates define vertical channels through which passes the water being treated. The tubes or corrugated plates have a large specific surface, i.e. up to 200 $m^2/m^3$, thereby permitting the fixing and accumulation of the micro-organisms. The vertical channels are approximately from 50 to 100 mm wide, and the tubes or plates and channels have a height of, for example from 1 to 6 meters. In a preferred arrangement of the present invention, the tubes or corrugated plates are formed of plastic material of the type known, for example, under the trade names "Cloisonyle" or "Plasdek". However, any other ordered material having a very large specific surface can be used without departing from the scope of the present invention.

In accordance with the present invention, the filling material of the upper layer comprises a loosely packed and random arrangement of a plurality of rings of known construction having a specific surface larger than that of the tubes or plates of the lower layer. The specific surface of the rings preferably is greater than 200 $m^2/m^3$. Each ring may be of a known construction, with or without a corrugated surface, and with or without a plurality of channels. Each ring advantageously has a diameter of approximately from 20 to 100 l mm. Advantageously, each ring has a height approximately equal to from 20% to 100% of the height of the intermediate layer. Advantageously, the upper layer has a height of from 1 to 6 meters. In a preferred embodiment of the present invention, the rings of the upper layer are of a plastic material of the type known under the trade name "Flocor R". However, any other material with a very large specific surface can be used without departing from the scope of the present invention.

In accordance with the present invention, the material of the intermediate layer comprises a plurality of loosely packed hollow cylindrical bodies supporting the upper layer and arranged, shaped and/or dimensioned in such a manner as to not shut off or close the channels defined by the tubes or plates of the lower layer. In a preferred embodiment, each hollow cylindrical body is in the form of an annular body having a diameter which is much larger than its height, for example equal to or more than 4 times such height. The diameter of each body is at least 1.5 times the widths of the channels defines by the tubes or plates of the lower layer, so that the bodies rest on such tubes or plates without closing the channels. The specific surface of the annular bodies is relatively small, for example approximately 100 $m^2/m^3$. The intermediate layer has a height preferably of from approximately 1 to 5 times the height of an individual ring of the material of the upper layer. The bodies of the intermediate layer advantageously are of a plastic material of the type known, for example, under the trade names "Flocor" or "Mass Transfer".

In accordance with the present invention, the apparatus has in an upper part thereof a trough for collecting and delivering the water treated by the filter. A protective grill extends across the trough to prevent passage thereinto of various material, for example the rings of the upper layer. The trough has a water guard, for example of several centimeters, which acts as a safety device against any accidental excess pressure or vacuum pressure.

Accordingly to a further feature of the present invention, there is provided an arrangement for reversing the flows of water to be treated entering the apparatus and of the treated water discharged therefrom, thereby making it possible simply by the opening and closing of valves, to clean or wash the apparatus and to remove sludge which collects in the lower part thereof during normal operation.

The apparatus of the present invention provides numerous advantages over the prior art. Thus, the present invention makes it possible to rapidly start the methanization process by the upper layer of the loosely packed material. Furthermore, the danger that the upper layer will become clogged is greatly reduced because the water to be treated first passes through the lower layer of ordered material in which the suspended material is liquified prior to reaching the upper layer. Furthermore, the possibility of reversing the flows of water to be treated and the treated water permits a simple and easy sludge removal operation and reduces still further the danger of clogging.

BRIEF DESCRIPTION OF THE DRAWINGS

Other objects, features and advantages of the present invention will be described in more detail below with reference to the accompanying drawings, illustrating a specific embodiment of the present invention described solely by way of illustration and without limitation, and wherein.

DETAILED DESCRIPTION OF THE INVENTION

Figure 1:
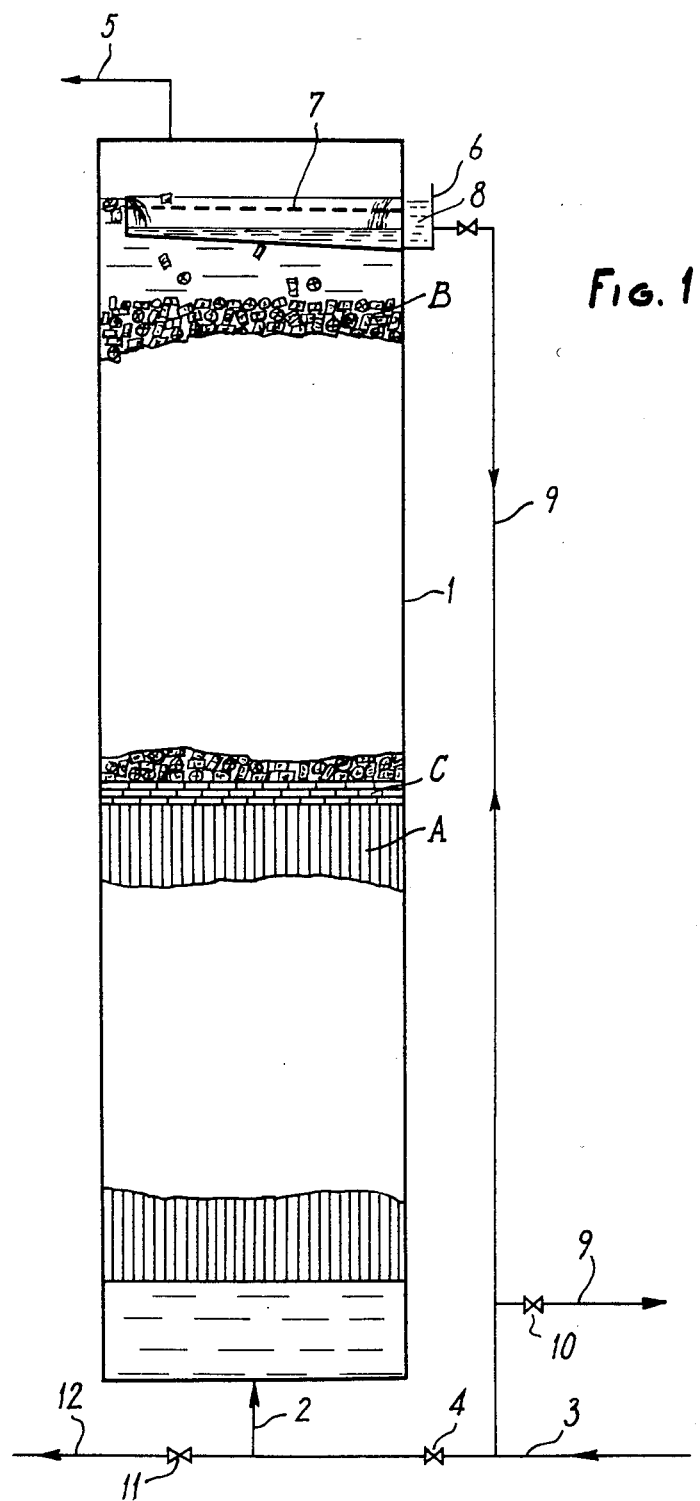
FIG. 1 is a schematic sectional view of an apparatus according to the present invention.

With reference to FIG. 1, the apparatus of the present invention includes an enclosure or casing 1 within which are disposed three superposed layers of material A, C, B, as viewed from the bottom to the top.

Figure 2:
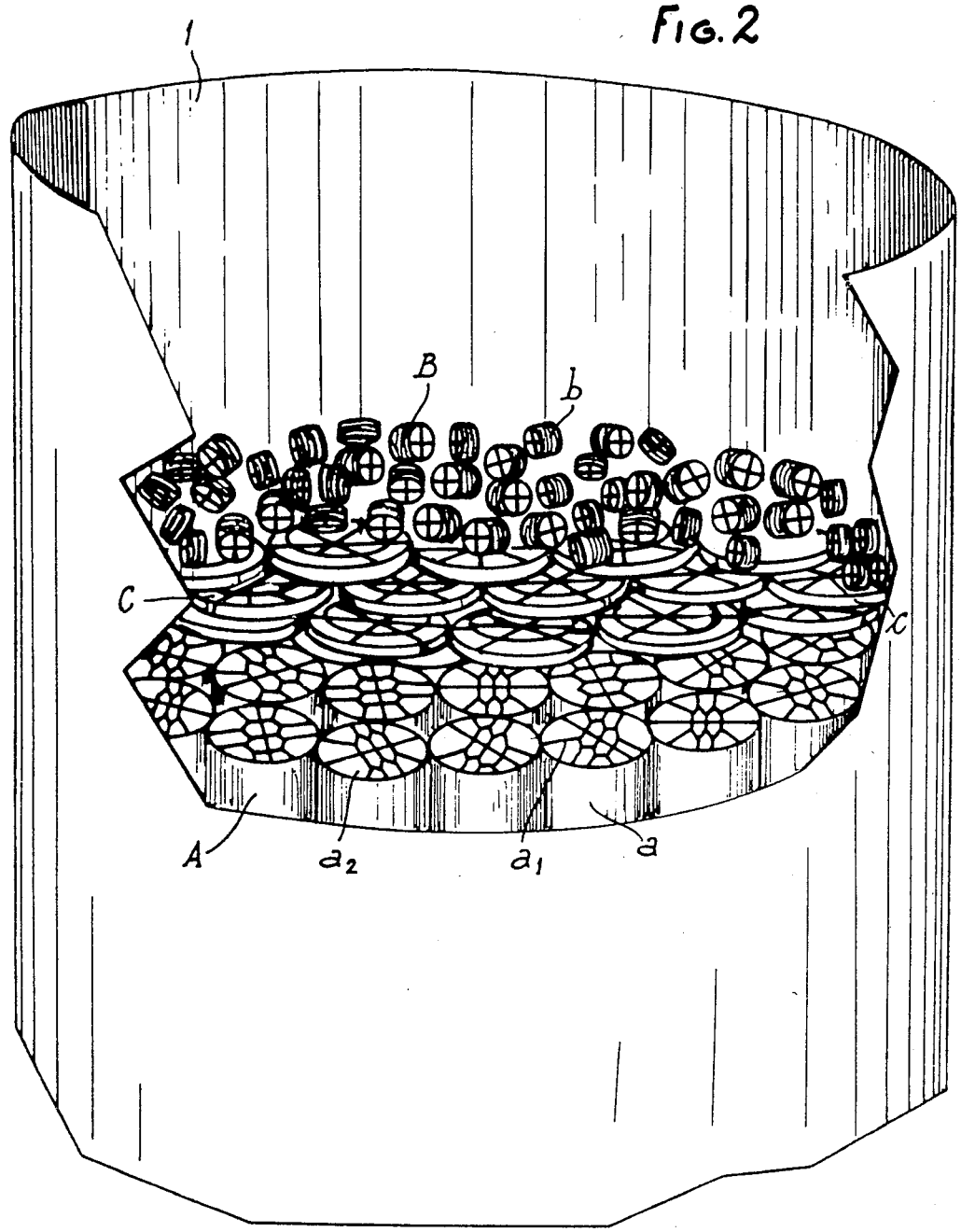
FIG. 2 is an enlarged partial perspective view, with portions broken away, illustrating in more detail the arrangement of the various layers of material forming the filter in accordance with the present invention.

The configuration of these layers is shown in more detail in FIG. 2.

Thus, lower layer A comprises a plurality of vertically extending and parallelly arranged tubes a having internal partitions a1 forming a plurality of channels a2 passing vertically upwardly from the bottom to the top of the layer and through which passes the effluent to be treated. Tubes a could be replaced by corrugated plates as will be understood by those skilled in the art. The tubes a are arranged in an ordered fashion, as will be apparent from a consideration of the drawings.

The material of upper layer B comprises a plurality of loosely packed or randomly arranged rings b having a specific surface larger than that of the tubes a forming the lower layer A. The rings b shown in FIG. 2 have internal partitions as shown schematically.

Between lower layer A and upper B is positioned an intermediate layer C comprising a plurality of loosely packed hollow cylindrical bodies c having a diameter which is distinctly larger than their height, as particularly is apparent from FIG. 2. Bodies c are partitioned in such a manner as to define spaces through which passes the effluent to be treated. Layer C supports upper layer B, and the bodies c are dimensioned, shaped and/or arranged such that, on the one hand, they rest on tubes a of lower layer A without shutting off or closing the channels thereof and, on the other hand, they oppose any passage of the rings b of the upper layer B downwardly into the tubes a of the lower layer A. Under these conditions, the intermediate layer C operates in the manner of a type of floor, distinctly separating the upper and lower layers, while preventing the penetration of one by the elements of the other, with significant advantages over a floor with respect to the "pliability" of the barrier thus formed and the role it plays in the operation of the apparatus.

Again with reference to FIG. 1, the liquid to be treated is introduced into the base of the apparatus by a conduit 2 which is connected to a conduit 3 delivering the liquid to be treated and which is provided with a valve 4. The liquid infiltrates or passes upwardly successively through the two layers A and B of filling material which are separated by the intermediate layer C. During this treatment operation, biogas is produced and is collected above the filter and then is evacuated through a conduit 5. Treated water is collected above the thus submerged filter in a trough 6 which is provided with a protective grill 7 and a water guard 8. The water is discharged from the apparatus by a conduit 9 extending from trough 6 and having a valve 10.

In accordance with a feature of the present invention, the water flows may be reversed to achieve washing of the apparatus simply by opening and closing various valves. Thus, valves 4 and 10 may be closed, whereby waste water is passed through conduit 9, into trough 6, passes downwardly through the filter, and is discharged through conduit 2 and a conduit 12 having therein a valve 11 which then is opened. It will be understood that valve 11 will be closed during normal treatment operation. In this manner, the filter may be washed and sludge formed in the apparatus may be removed. This is achieved simply by opening and closing various valves of the apparatus.

Comparative tests conducted with conventional filters and with a filter of the present invention have shown that, unlike conventional filters, the filter of the present invention does not clog, even after a very long operating period, and that it was possible to obtain a correct yield of elimination of the COD without necessitating a reduction of the volume loads of effluent to be treated, and that there was no indication over the course of time of any disengagement of the sludge with resultant destabilization of the bacterial activity.

In accordance with a particularly advantageous arrangement of the present invention, the tubes of layer A have a specific surface of up to 200 $m^2/m^3$, the channels formed thereby are approximately from 50 to 100 mm wide, and the tubes a have a height of from 1 to 6 meters. Further in accordance with a particularly advantageous arrangement of the present invention, the rings b of upper layer B have a specific surface greater than 200 $m^2/m^3$, each ring b has a diameter of approximately from 20 to 100 mm, upper layer B has a height of from 1 to 6 meters, and each ring b has a height approximately equal to 20% to 100% of the height of intermediate layer C.

In accordance with a further particularly preferred feature of the present invention, the diameter of each body c of intermediate layer C is at least 1.5 times the widths of the channels defined by tubes a of lower layer A, each body c has a diameter at least 4 times larger than the height thereof, and bodies c have a specific surface of approximately 100 m²/m³.

These dimensions and parameters however are intended to refer to particularly preferred features of the present invention, and are not intended to be limiting to the general scope of the present invention, as other dimensions and parameters are intended to be within the scope of the present invention.

Although the present invention has been described and illustrated with respect to a preferred embodiment thereof, various changes and modifications to the specifically described and illustrated features may be made without departing from the spirit and scope of the present invention.

We claim:

1. In an apparatus for the anaerobic filtration of waste water, said apparatus being of the type including an enclosure having therein a submerged filter of filling material, means for introducing waste water to be treated into a lower portion of said enclosure such that said waste water passes through said filter from bottom to top and submerges said filter, during which biogas is produced, means for removing filtered water from an upper portion of said enclosure above said filter, and means for collecting said biogas above said filter, the improvement wherein said filter comprises:

a lower layer comprising an ordered arrangement of vertically extending members defining vertical channels through which passes the water being treated and having a large specific surface of up to 200 m²/m³;

an upper layer positioned above said lower layer and comprising a loosely packed arrangement of members having a specific surface greater than 200 m²/m³; and means for supporting said upper layer and for separating said upper layer from said lower layer and comprising an intermediate layer of loosely packed hollow cylindrical bodies dimensioned or shaped to rest on said members of said lower layer without blocking said vertical channels and to prevent said members of said upper layer from penetrating downwardly into said members of said lower layer, each said cylindrical body having a diameter of at least four times larger than the height thereof, said diameter of each said cylindrical body being at least 1.5 times the widths of said channels defined by said members of said lower layer.

2. The improvement claimed in claim 1, wherein said members of said lower layer comprises a plurality of vertically extending and parallelly arranged tubes or corrugated plates.

3. The improvement claimed in claim 2, wherein said channels are approximately from 50 to 100 mm wide.

4. The improvement claimed in claim 2, wherein said tubes or plates have a height of from one to six meters.

5. The improvement claimed in claim 2, wherein said members of said upper layer comprises a plurality of rings, each said ring having a greater height than diameter.

6. The improvement claimed in claim 5, wherein each said ring has a diameter of approximately from 20 to 100 mm.

7. The improvement claimed in claim 5, wherein said upper layer has a height of from one to six meters.

8. The improvement claimed in claim 5, wherein each said ring has a height approximately equal to from 20% to 100% of the height of said intermediate layer.

9. The improvement claimed in claim 1, wherein said cylindrical bodies have a specific surface of approximately 100 m²/m³.

10. The improvement claimed in claim 1, further comprising a trough at the top of said apparatus for collecting water treated by said filter, a protective grill extending across said trough, said trough having a water guard as a safety device against excess pressure fluctuations, and means for reversing the flows of water through said apparatus, thereby for washing said apparatus and removing sludge formed therein.

* * * * *